May 11, 1926. 1,584,558
E. KRAFFT
DIPPER
Filed August 17, 1925
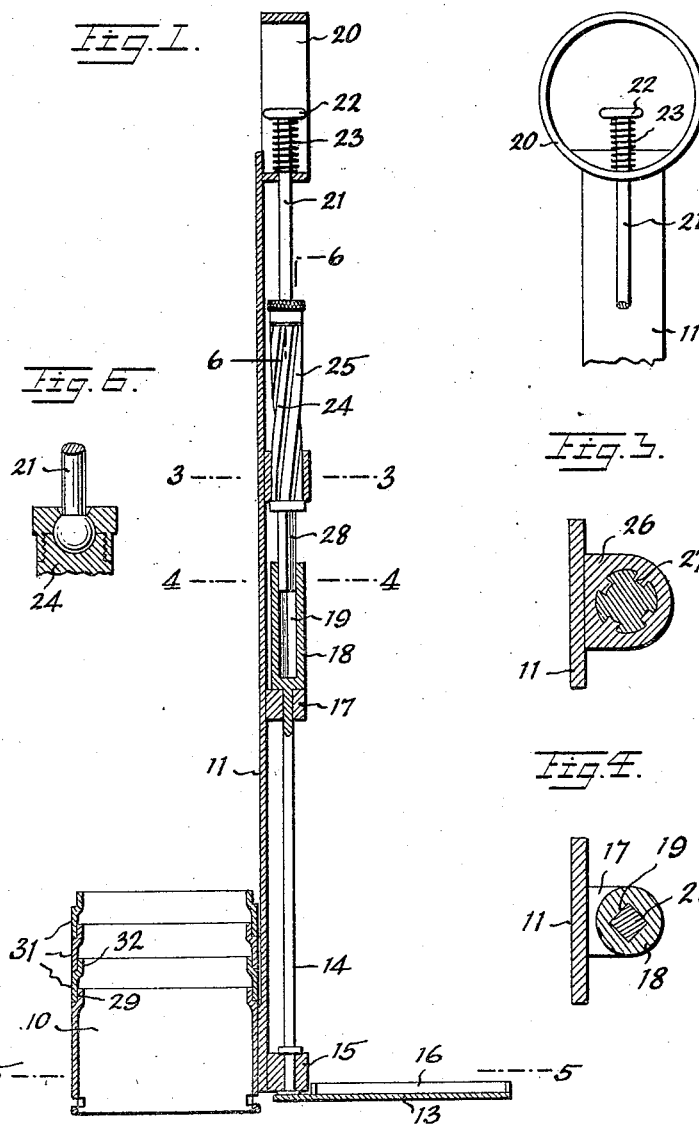

Patented May 11, 1926.

1,584,558

UNITED STATES PATENT OFFICE.

EMIL KRAFFT, OF WEEHAWKEN, NEW JERSEY.

DIPPER.

Application filed August 17, 1925. Serial No. 50,790.

This invention relates to a dipper and aims for its principal object to provide a dipper which may be submerged in a liquid for removing the same to a predetermined level without creating a material disturbance of the liquid.

The invention further comprehends a dipper, the body or bowl of which is capable of adjustment to vary its capacity.

The invention more specifically contemplates a dipper body or bowl in which the bottom is laterally swingable from a closed to an opened relation to allow for the passage of the body through the liquid with the least possible disturbance after which said bottom is swingable to a closed relation for trapping and removing the liquid within the body.

The invention further comprehends means carried by the dipper handle and operatively connected with the bottom for effecting the swinging movement of the same to its closed and opened relations to the dipper body.

The invention furthermore embodies a dipper which is comparatively simple in its construction and mode of operation, inexpensive to manufacture, and efficient in its purpose.

With the above recited and other objects in view, the invention is exemplified in the accompanying drawings, the following description and the appended claims, but it is understood that embodiments other than those actually disclosed which fall within the scope of the appended claims, may be resorted to when found expedient.

In the drawings—

Figure 1 is a vertical sectional view through a dipper constructed in accordance with the invention, illustrating the bottom in opened relation to the dipper body;

Fig. 2 is a fragmentary elevation of the upper end of the dipper handle;

Fig. 3 is a horizontal sectional view taken approximately on the line 3—3 of Fig. 1;

Fig. 4 is a similar view taken approximately on the line 4—4 of Fig. 1;

Fig. 5 is a horizontal sectional view taken approximately on the line 5—5 of Fig. 1;

Fig. 6 is a vertical fragmentary view taken approximately on the line 6—6 of Fig. 1;

Fig. 7 is a side view of the dipper body.

Referring to the drawings by characters of reference, 10 designates a substantially cylindrical dipper body, which is attached to the lower end of the handle 11. The dipper body is provided with a semi-annular slot 12 adjacent its lower end to accommodate a laterally swingable bottom 13 secured to the lower end of a rotary shaft 14 extending through a bearing lug 15 at the lower end of the handle 11. The bottom 13 is provided with a marginal semi-annular flange 16, which is adapted to impinge against the side wall of the dipper body adjacent the slot 12 to assist in sealing the bottom against leakage when the bottom is in closed relation to the body. The shaft 14 extends through a second vertically spaced bearing lug 17 and is formed with an enlarged upper terminal 18 having a squared bore or socket 19 axially thereof. At the upper end or extremity of the handle 11, a finger ring 20 is secured through which a stem 21 extends downwardly, the stem being provided at its upper end with a manipulating head 22, between which and the lower end of the ring is interposed a coil expansion spring 23. The stem which is slidable vertically through the ring is swiveled at its lower end to a member 24, which is provided with external spiral grooves 25 and movable through a stationary lug 26 having complementary spiral ribs 27 engaging the grooves 25, whereby downward movement of the member 24 through the lug 26 sets up a turning movement of said member. The member is provided with an axially projecting squared extension 28, which is received by the squared bore 19 of the head 18, whereby downward pressure exerted on the manipulating head or button 22 effects a turning movement of the member 24 in one direction and a consequent turning movement of the shaft 14 and bottom 13, for swinging said bottom 13 laterally to an open condition, as illustrated in Figs. 1 and 5. When the head 22 is released, the spring functions to draw the member 24 in an upward direction effecting a reverse or retrograde turning movement of the same and consequent retrograde turning movement of the shaft 14 to swing the bottom 13 to its normally closed relation with the dipper body 10.

In order to provide means for adjusting or regulating the capacity of the dipper body 10, it is reduced in diameter at its upper end as at 29, to receive the enlarged lower end 30 of a ring 31 having a similar reduced upper end 32 with which other similarly formed rings 31 may be associated to increase the depth and capacity of the dipper.

In use, when it is desired to remove liquid from within a receptacle or container to a predetermined level without materially disturbing the liquid, the user depresses the head 22 to swing the bottom 13 to an opened relation to the body 10, which permits of the submersion into and passage of the dipper body through the liquid without materially disturbing the same. After the dipper body has been submerged to the proper depth, the head 22 is released to allow the spring to return the dipper bottom 13 to a closed relation for trapping and removing the liquid within the body.

What is claimed is:

1. A dipper comprising a cylindrical open ended body, a handle connected therewith at its lower end, a semi-annular slotted portion at the lower end of said dipper body, a vertical shaft rotatably mounted on the handle, a bottom secured thereto for lateral swinging movement through the slotted portion respectively to closed or open relation with respect to the body, and means carried by the upper end of the handle for effecting swinging movements of said bottom in opposite directions, said means comprising an axially movable threaded element having splined connection with the upper end of the shaft, a complementary threaded bearing therefor, and a bushing rod extending through the upper end of the dipper handle and swivelled to said element.

2. A dipper comprising a cylindrical open ended body, a handle connected therewith at its lower end, a semi-annular slotted portion at the lower end of said dipper body, a vertical shaft rotatably mounted on the handle, a bottom secured thereto for lateral swinging movement through the slotted portion respectively to closed or open relation with respect to the body, and means carried by the upper end of the handle for effecting swinging movements of said bottom in opposite directions, said means comprising an axially movable threaded element having splined connection with the upper end of the shaft, a complementary threaded bearing therefor, a push rod extending through the upper end of the dipper handle and swivelled to said element, a head at the upper end of the push rod, and a spring interposed respectively between the head and the upper end of the dipper for normally moving the push rod in a direction to effect the closing of the bottom.

EMIL KRAFFT.